US012660048B2

(12) United States Patent
Cho et al.

(10) Patent No.: US 12,660,048 B2
(45) Date of Patent: Jun. 16, 2026

(54) HEATING PLATE AND SUBSTRATE PROCESSING APPARATUS INCLUDING THE SAME

(71) Applicant: Samsung Electronics Co., Ltd., Suwon-si (KR)

(72) Inventors: Chulmin Cho, Suwon-si (KR); Seunghwan Ko, Seoul (KR); Wooseop Shin, Seongnam-si (KR); Minwoo Kim, Seoul (KR); Kyoungwhan Oh, Suwon-si (KR)

(73) Assignees: Samsung Electronics Co., Ltd., Gyeonggi-do (KR); Seoul National University R&DB Foundation, Seoul (KR)

( * ) Notice: Subject to any disclaimer, the term of this patent is extended or adjusted under 35 U.S.C. 154(b) by 552 days.

(21) Appl. No.: 18/306,570

(22) Filed: Apr. 25, 2023

(65) Prior Publication Data

US 2024/0155741 A1 May 9, 2024

(30) Foreign Application Priority Data

Nov. 3, 2022 (KR) ........................ 10-2022-0144907

(51) Int. Cl.
*H05B 3/34* (2006.01)
*H05B 3/12* (2006.01)
*H05B 3/54* (2006.01)

(52) U.S. Cl.
CPC ................ *H05B 3/34* (2013.01); *H05B 3/12* (2013.01); *H05B 3/54* (2013.01); *H05B 2203/002* (2013.01)

(58) Field of Classification Search
None
See application file for complete search history.

(56) References Cited

U.S. PATENT DOCUMENTS

| | | | | |
|---|---|---|---|---|
| 8,748,782 | B2 * | 6/2014 | Goto | H01L 21/68792 219/412 |
| 10,045,843 | B2 | 8/2018 | Kim et al. | |
| 10,154,592 | B2 | 12/2018 | Rogers et al. | |

(Continued)

FOREIGN PATENT DOCUMENTS

| | | | | |
|---|---|---|---|---|
| KR | 20150013637 A | | 2/2015 | |
| KR | 20220017725 A | * | 2/2022 | H01L 21/683 |

OTHER PUBLICATIONS

Y. Chae-rin ‘PDMS Surface Liquid Metal Patterning Based PDMS Using Laser Ablation Liquid Metal Patterning Based PDMS Using Laser Ablation’ Korean Society of Precision Engineering, 2022, Academic Conference Paper Collection, nanomechanical technology.

*Primary Examiner* — Courtney D Heinle
*Assistant Examiner* — Danielle M. Christensen
(74) *Attorney, Agent, or Firm* — Harness, Dickey & Pierce, P.L.C.

(57) ABSTRACT

A substrate processing apparatus includes a chamber providing a space configured to process a substrate and a heating plate arranged within the chamber, the heating plate including a substrate plate configured to support the substrate and having a first region, a second region and a third region sequentially arranged in a radial direction from a center of the substrate plate, and a liquid metal pattern patterned on the substrate plate and extending on the first region, the second region and the third region, the substrate plate being stretchable.

20 Claims, 8 Drawing Sheets

(56) References Cited

U.S. PATENT DOCUMENTS

| | | | | |
|---|---|---|---|---|
| 11,230,134 | B2 | 1/2022 | Zhu et al. | |
| 11,558,935 | B2 * | 1/2023 | Tong | H05B 3/14 |
| 2009/0000552 | A1 * | 1/2009 | Sohda | H01L 21/67288 118/728 |
| 2009/0057289 | A1 | 3/2009 | Williams | |
| 2019/0281666 | A1 | 9/2019 | Lu et al. | |
| 2019/0365113 | A1 | 12/2019 | Augustine et al. | |
| 2020/0085299 | A1 | 3/2020 | Xu et al. | |
| 2020/0234842 | A1 | 7/2020 | Majidi et al. | |
| 2021/0213718 | A1 | 7/2021 | Sun et al. | |

* cited by examiner

HEATING PLATE AND SUBSTRATE PROCESSING APPARATUS INCLUDING THE SAME

CROSS-RELATED APPLICATION

This application claims priority under 35 USC § 119 to Korean Patent Application No. 10-2022-0144907, filed on Nov. 3, 2022 in the Korean Intellectual Property Office (KIPO), the contents of which are herein incorporated by reference in their entirety.

BACKGROUND

1. Field

Example embodiments relate to heating plates and substrate processing apparatuses including the same. More particularly, example embodiments relate to heating plates configured to heat a wafer in a bake apparatus of a photo facility and substrate processing apparatuses including the same.

2. Description of the Related Art

In a photo facility for a photolithography process, as a wafer is supported and heated by a heater during a bake process, warpage occurs in the wafer, and accordingly in order to efficiently transfer heat from the heater to the warped wafer, negative pressure may be generated to adsorb the wafer on the heater. However, there is a problem in that a considerable amount of air is suctioned in to adsorb the warped wafer, and irregular airflow occurs across an edge portion of the wafer, thereby reducing the process yield. Further, since material properties such as resistivity of a heating wire used in the heater are predetermined, there is a limit to tuning the resistivity of the heating wire within a given space.

SUMMARY

Example embodiments provide substrate processing apparatuses capable of easily designing electrical conductivity for each region and heating a wafer to a uniform temperature.

Example embodiments provide heating plates used as a heater of the substrate processing apparatus.

According to example embodiments, a substrate processing apparatus includes a chamber providing a space configured to process a substrate and a heating plate arranged within the chamber, the heating plate including a substrate plate configured to support the substrate and having a first region, a second region and a third region sequentially arranged in a radial direction from the center of the substrate plate, and a liquid metal pattern patterned on the substrate plate and extending on the first region, the second region and the third region, the substrate plate being stretchable.

According to example embodiments, a substrate processing apparatus includes a chamber providing a space configured to process a substrate and a substrate stage within the chamber and configured to support the substrate. The substrate stage includes a substrate plate configured to support the substrate and having a first region, a second region and a third region sequentially arranged in a radial direction from the center of the substrate plate and a liquid metal pattern patterned on the substrate plate and extending on the first region, the second region and the third region, the substrate plate being stretchable. The liquid metal pattern includes a first extension line extending within the first region, a second extension line extending within the second region and a third extension line extending within the third region.

According to example embodiments, a heating plate for bake apparatus includes a substrate plate having a first region, a second region and a third region sequentially arranged in a radial direction from the center of the substrate plate and a liquid metal pattern patterned on the substrate plate and extending on the first region, the second region and the third region, the substrate plate being stretchable. The liquid metal pattern includes a first extension line extending within the first region, a second extension line extending within the second region and a third extension line extending within the third region. The first to third extension lines are connected to each other to form one heating wire.

According to example embodiments, the substrate processing apparatus may include a stretchable substrate plate configured to support a substrate such as a wafer and a heating plate having a liquid metal pattern patterned on the substrate plate as a heating wire for heating the substrate. Since the liquid metal pattern includes liquid metal, the liquid metal may have elasticity and different electromagnetic characteristics for each region of the substrate plate.

Since the substrate plate and the liquid metal pattern are stretchable, the heating plate may be easily deformed when the wafer W is vacuum-adsorbed, and thus the heating plate may be more closely adhered to the wafer W warped at high temperature, to thereby increase heat transfer and heat the wafer W at a uniform temperature. Further, it may be possible to prevent or reduce disturbance of air at the wafer edge portion by suppressing unnecessary airflow in order to adhere the wafer W to the heating plate.

Furthermore, the liquid metal pattern may be easily tuned to have different resistivities for each region of the substrate plate, to thereby increase the degree of freedom in heating wire design and the temperature of the heating plate may be controlled with one temperature controller to thereby increase controllability.

DETAILED DESCRIPTION

Hereinafter, example embodiments will be explained in detail with reference to the accompanying drawings.

Figure 1:
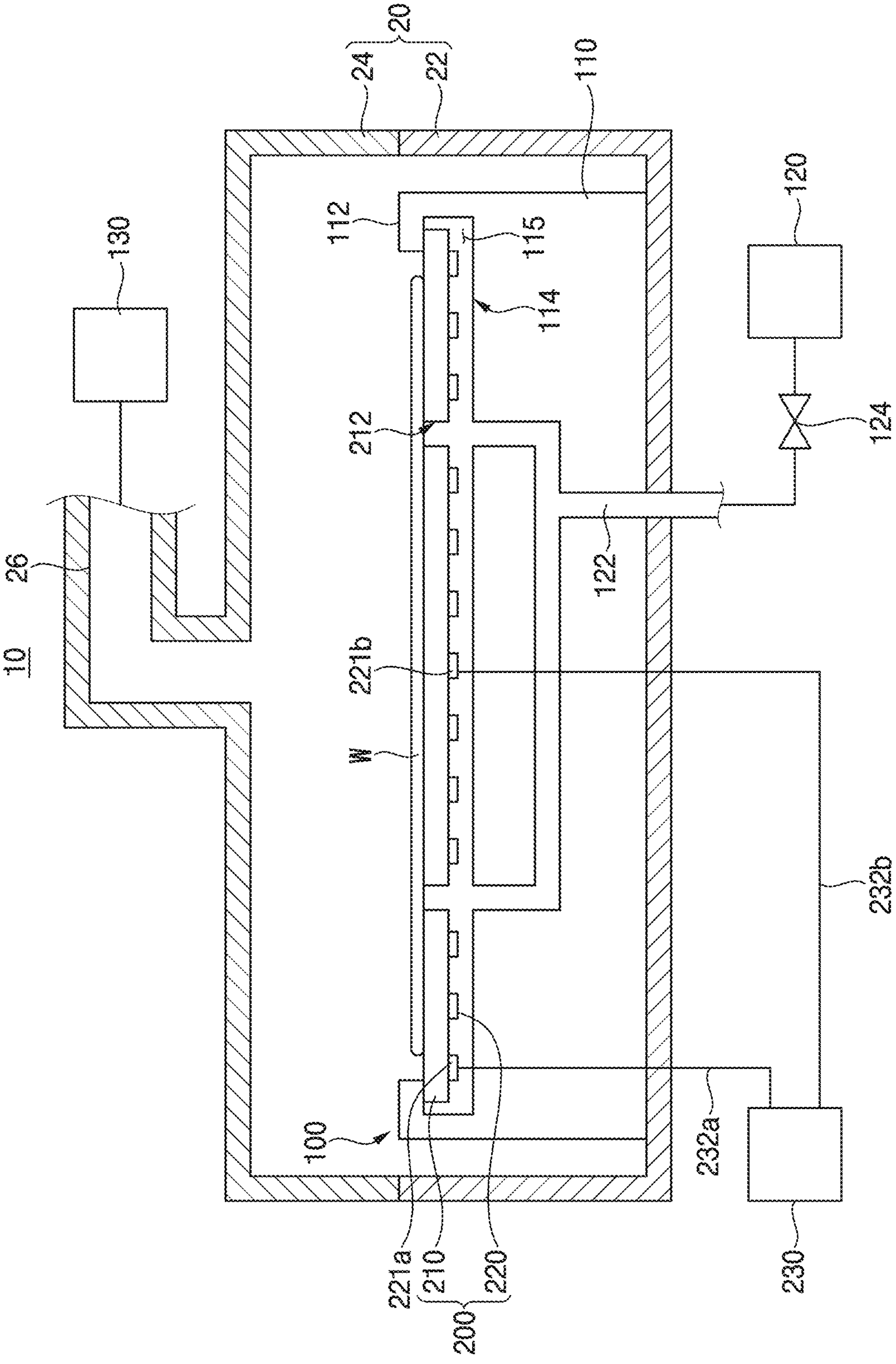
FIGS. 1 and 2 are cross-sectional views illustrating a substrate processing apparatus in accordance with example embodiments.
Figure 2:
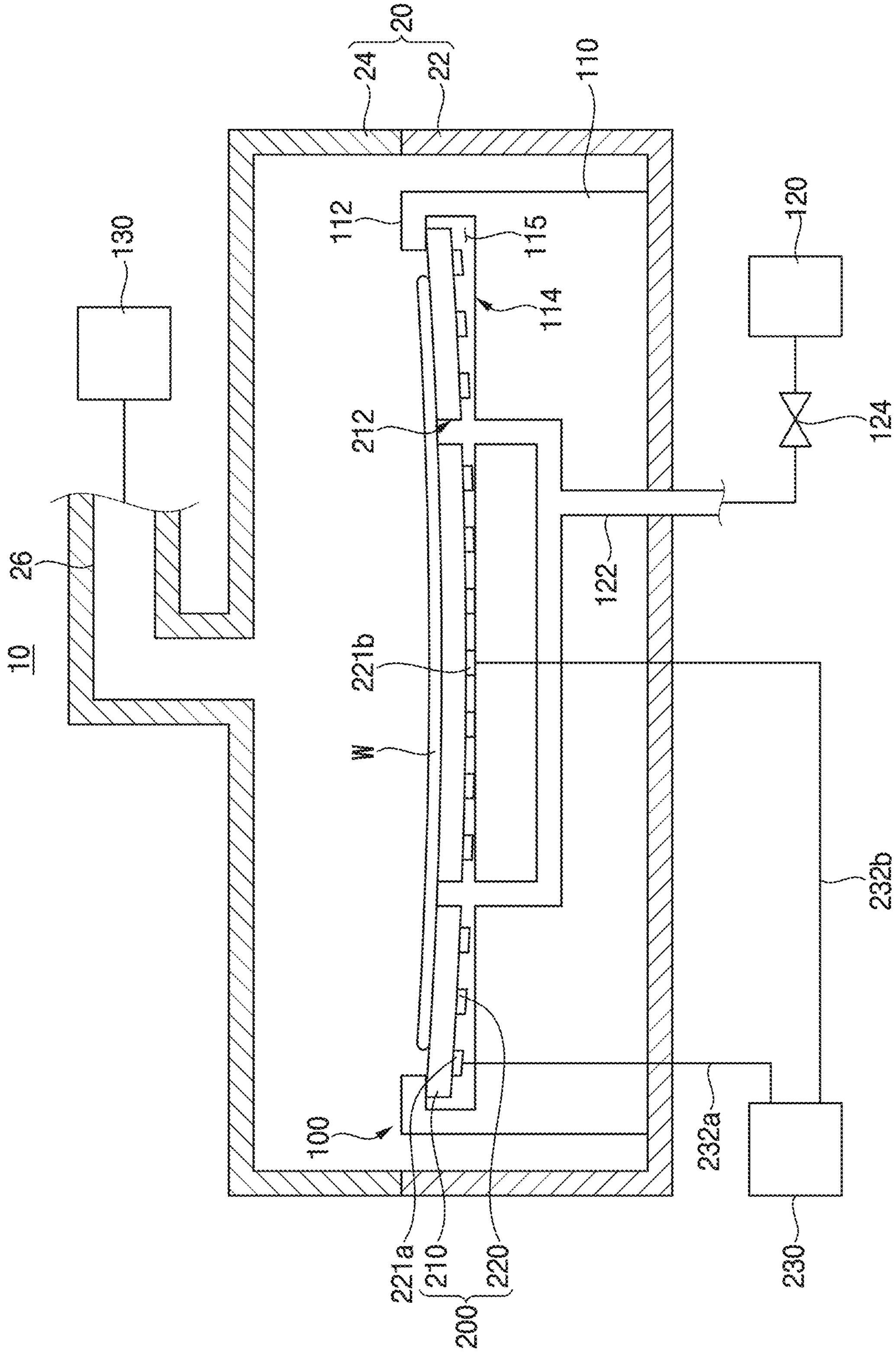
Figure 3:
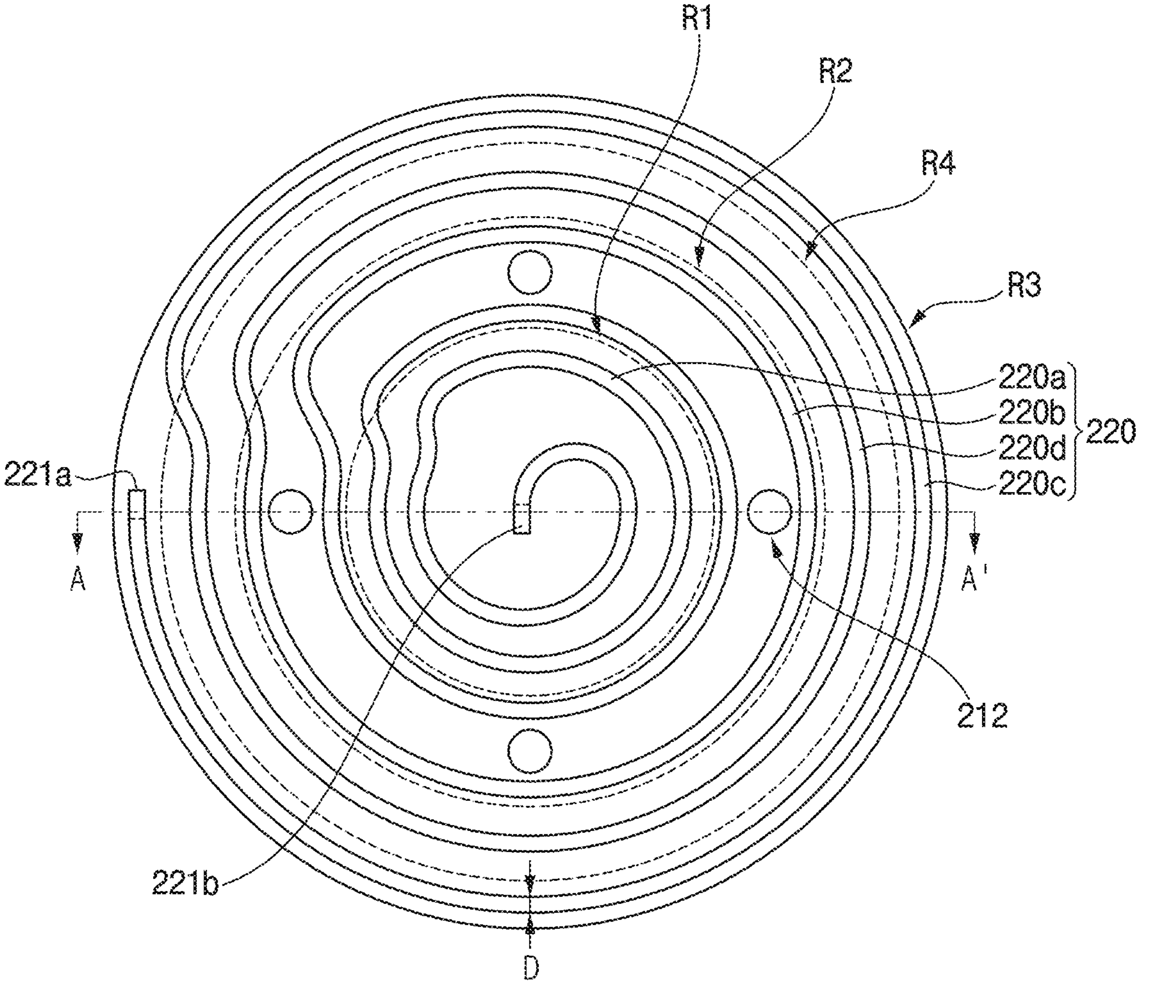
FIG. 3 is a bottom view illustrating a bottom surface of a heating plate of the substrate processing apparatus in FIG. 1.
Figure 4:
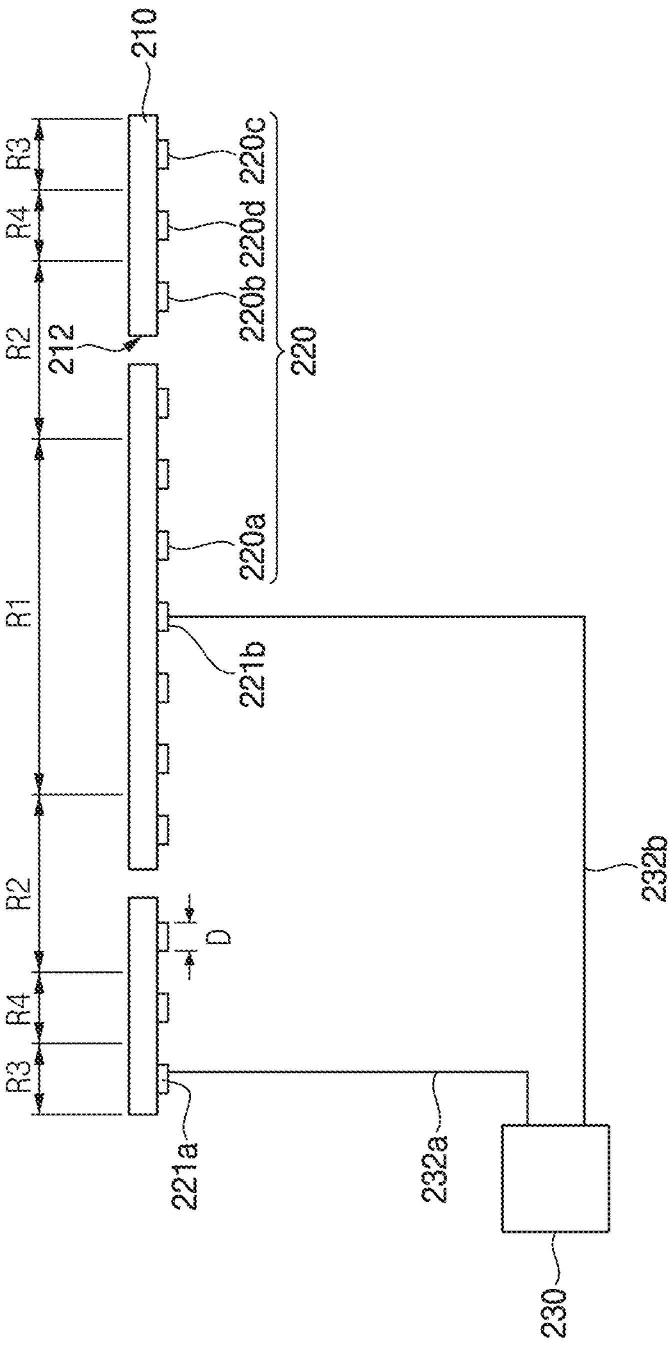
FIG. 4 is a cross-sectional view taken along the line A-A' in FIG. 3.
Figure 5:
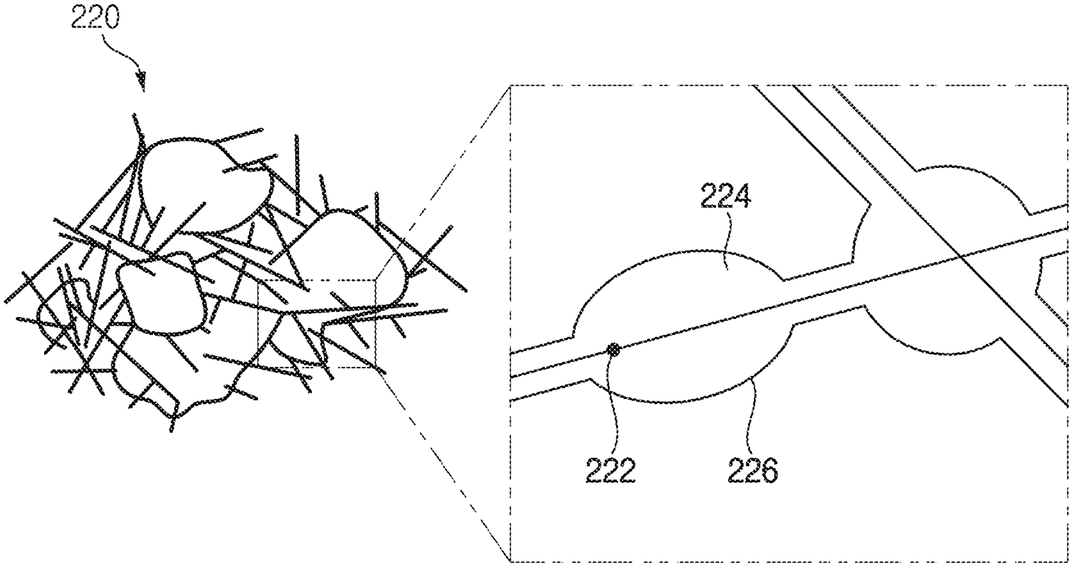
FIG. 5 is a view illustrating a portion of a liquid metal pattern of the heating plate in FIG. 3.

FIGS. 1 and 2 are a cross-sectional views illustrating a substrate processing apparatus in accordance with example embodiments. FIG. 3 is a bottom view illustrating a bottom surface of a heating plate of the substrate processing apparatus in FIG. 1. FIG. 4 is a cross-sectional view taken along line A-A' in FIG. 3. FIG. 5 is a view illustrating a portion of a liquid metal pattern of the heating plate in FIG. 3. FIG. 1 is a cross-sectional view illustrating a wafer supported on the heating plate, and FIG. 2 is a cross-sectional view illustrating a wafer heated by the heating plate.

Referring to FIGS. 1 to 5 a substrate processing apparatus 10 may include a chamber 20 and a substrate stage 100 arranged within the chamber 20 to support and heat a substrate such as a wafer. In addition, the substrate processing apparatus 10 may further include a vacuum generator 120, a vent portion 130 and a power supply 230.

In example embodiments, the substrate processing apparatus 10 may include a bake apparatus that is configured to perform a bake process on a photoresist layer coated on a wafer or to perform a bake process on the photoresist layer in which an exposure process has been performed.

For example, after performing the exposure process, a post exposure bake (PEB) process may be performed before performing a developing process. The bake process may be performed to reduce physical stress of an exposed photoresist. During the exposure process, an incident light and a reflected light may be superposed to form a standing wave, and wave patterns may occur on a wall surface of a pattern due to the standing wave. The bake process may remove and migrate such wave patterns to increase resolution. The bake process may be performed to heat the wafer W under a temperature within a range of about or exactly 120° C. to about or exactly 150° C.

In particular, the chamber 20 may provide a sealed space to perform the bake process on the wafer (W). The chamber 20 may include a metal such as aluminum or stainless steel. The chamber 20 may include a lower chamber 22 and an upper chamber 24 coupled to each other to provide the space. The upper chamber 24 may be provided to be movable up and down on the lower chamber 22. After the wafer W is loaded on the substrate stage 100 in the chamber 20, the upper chamber 24 may descend and be coupled to the lower chamber 22 to provide the sealed space. In some example embodiments, both the lower chamber 22 and the upper chamber 24 may move to be coupled, the lower chamber 22 may ascend to couple with the upper chamber 24, however the inventive concepts are not limited.

In example embodiments, the stage 100 may be disposed inside the chamber 20 to support the wafer W. The stage 100 may be disposed within the lower chamber 22. The stage 100 may include a heating plate 200 for supporting and heating the wafer W. The stage 100 may further include a base plate 110 that supports the heating plate 200. The heating plate 200 may include a stretchable (e.g., expandable, extendable) substrate plate 210 and a liquid metal pattern 220 patterned on the substrate plate 210.

The substrate plate 210 may be fixedly installed in a holder portion 112 on an upper peripheral region of the base plate 110. An outer circumferential portion of the substrate plate 210 may be fixedly supported by the holder portion 112 of the base plate 110. A receiving groove 114 for receiving the substrate plate 210 may be provided in an upper surface of the base plate 110. The plate 210 may be disposed in the receiving groove 114 of the base plate 110. When the substrate plate 210 is fixed to the holder portion 112 of the base plate 110, a sealed space may be formed between a lower surface of the substrate plate 210 and a bottom surface of the receiving groove 114 of the base plate 110.

The substrate plate 210 may include adsorption holes 212 for adsorbing the wafer W by negative pressure. The adsorption holes 212 may adsorb the wafer W through negative pressure, such as vacuum pressure, to hold down the wafer W on the substrate plate 210 during the bake process. The adsorption holes 212 may be in fluid communication with a sealed space 115 between the lower surface of the substrate plate 210 and the bottom surface of the receiving groove 114 of the base plate 110.

The base plate 110 may be provided with a vent line 122 in communication with the adsorption holes 212. A first end portion of the vent line 122 may be connected to the bottom surface of the receiving groove 114 of the base plate 110. A second end portion of the vent line 122 may be connected to the vacuum generator 120. The vacuum generator 120 may include a vacuum pump and form vacuum pressure in the adsorption holes 212 through the vent line 122 by on-off control of a control valve 124.

The substrate plate 210 may include a stretchable material. For example, the substrate plate 210 may include a polymer material, and in particular, some example embodiments may include a high molecular polymer material. Examples of the polymer material may be PDMS (Polydimethylsiloxane), ECOFLEX, SBS (styrene-butadiene-Styrene), and the like.

As illustrated in FIG. 2, when the wafer W is heated by the heating plate 200, vacuum pressure may be generated in the adsorption holes 212 through the vent line 122 by the on-off control of a control valve 124 to adsorb the wafer W. When negative pressure such as vacuum pressure is formed in the adsorption holes 212, because the substrate plate 210 is flexible and has elasticity, the substrate plate 210 may be convexly curved downward toward the bottom surface of the receiving groove 114 of the base plate 110, and the upper surface of the substrate plate 210 may be closer to the wafer W that is warped at a high temperature.

In example embodiments, the liquid metal pattern 220 may be patterned on one surface of the base plate 110 and may extend in one direction. The liquid metal pattern 220 may include a biphasic liquid metal composite.

As illustrated in FIG. 5, the liquid metal pattern 220 may include a plurality of nanowires 222, a liquid metal 224 surrounding the nanowires 222 and an oxide layer 226 (e.g., an oxide film) formed on the surface of the liquid metal 224. For example, the nanowires 222 may include silver nanowires (AgNW), copper nanowires (CuNW), gold nanowires (AuNW), etc. The liquid metal 224 may include a gallium-indium alloy (Ga—In) or a gallium-indium-tin alloy (Ga—In—Sn). The oxide layer 226 may include gallium oxide ($Ga_2O_3$) formed of gallium.

In example embodiments, the liquid metal pattern 220 may include silver nanowires (AgNW) and eutectic gallium-indium alloy (EGaIn). Eutectic gallium-indium alloy (EGaIn) is a liquid metal made by synthesizing gallium and indium, may have low reactivity, and may have high surface tension due to the oxide layer 226 formed by gallium (Ga). Eutectic gallium-indium alloy (EGaIn) has a melting point of less than 15° C., so it may maintain a liquid state at room temperature and provide high wettability to the surface of a non-metallic material by forming an oxide layer when exposed to the air. The eutectic gallium-indium alloy can stably form an independent structure while maintaining its shape by such a surface oxide layer.

The liquid metal pattern 220 may have elasticity because the liquid metal pattern includes liquid metal. The liquid metal pattern 220 may include a biphasic liquid metal composite formed by irradiating a laser on a mixture of the silver nanowire and the gallium-indium alloy. The biphasic liquid metal composite may have a change in electromagnetic characteristics, for example, conductivity, resistivity, and the like, according to the intensity of the laser irradiated onto the mixture. A method of forming the liquid metal pattern will be described later.

As illustrated in FIGS. 3 and 4, the substrate plate 210 may have a first region R1, a second region R2, and a third region R3 sequentially arranged in a radial direction from the center. In addition, the substrate plate 210 may have a fourth region R4 between the second region R2 and the third region R3. The liquid metal pattern 220 may extend on the first region R1, the second region R2, the third region R3, and the fourth region R4 of the substrate plate 210. The adsorption holes 212 may be spaced apart in a circumferential direction in the second region R2.

The liquid metal pattern 220 may include a first extension line **220*a* extending within the first region R1, a second extension line 220*b* extending within the second region R2, a third extension line 220*c* extending within the third region R3 and a fourth extension line 220*d* extending within the fourth region R4. The first to fourth extension lines 220*a*, 220*b*, 220*c*, and 220*d* may have the same width D as each other. Alternatively, the first to fourth extension lines 220*a*, 220*b*, 220*c* and 220*d*** may have different widths.

In example embodiments, the first to fourth extension lines **220*a*, 220*b*, 220*c*, and 220*d* may be connected to each other to form one heating wire. The power supply 230 may be electrically connected to both ends of the one heating wire. The power supply 230 may be electrically connected to the heating wire by first and second power supply lines 232*a* and 232*b*. The liquid metal pattern 220 may include a first electrode portion 221*a* connected to the first power supply line 232*a* and a second electrode portion 221*b* connected to the second power supply line 232*b*. The power supply 230** may supply power to the heating wire to maintain a target temperature at a range of about or exactly 120° C. to about or exactly 150° C.

The liquid metal pattern 220 may have different electromagnetic characteristics for each region. The first extension line **220*a* may have a first resistivity ρ1, the second extension line 220*b* may have a second resistivity ρ2 different from the first resistivity, the third extension line 220*c* may have a third resistivity ρ3 different from the first and second resistivities, and the fourth extension line 220*d*** may have a fourth resistivity ρ4 different from the first to third resistivities.

For example, the second resistivity ρ2 may be greater than the first resistivity ρ1, and the third resistivity ρ3 may be greater than the first resistivity ρ1 and less than the second resistivity ρ2. The fourth resistivity ρ4 may be smaller than the first resistivity ρ1.

The second resistivity ρ2 of the second extension line **220*b* provided in the second region R2 where the adsorption holes 212 are disposed may be tuned to have the largest value. When a vacuum pressure is generated in the adsorption holes 212 to adsorb the wafer W warped at a high temperature, the temperature of the wafer in the second region R2 may drop irregularly due to the air flowing through the adsorption holes 212. By tuning the second resistivity ρ2 of the second extension line 220*b* provided in the second region R2** to be the largest, the temperature of the wafer may be prevented from falling or have a reduced effect.

In addition, the third resistivity ρ3 of the third extension line **220*c* provided in the third region R3**, which is the outermost region of the wafer W, may be tuned to be greater than the first resistivity ρ1. Accordingly, it may be possible to reduce or prevent the temperature from falling irregularly due to disturbance of the air at the edge portion of the wafer W.

Accordingly, the heating plate 200 may have different target temperatures for each region. The heating plate 200 may differently control the temperature for each region to perform temperature compensation for an excessive air flow rate in the adsorption hole 212 and air disturbance at the edge portion of the wafer W. Further, in order to control the temperature for each region, the heating wire of the heater may be designed to be in series by adjusting the resistivity without changing the length or thickness of the heating wire, so that the temperature of all regions can be controlled independently with one temperature controller.

In example embodiments, the vent portion 130 may inject or exhaust air into or from the chamber 20. The vent portion 130 may be connected to an exhaust passage 26 provided in the upper chamber 24. The vent portion 130 may inject air when the upper chamber 24 is separated from the lower chamber 22. Alternatively, the vent portion 130 may exhaust air from the chamber 20 to the outside. In addition, the vent portion 130 may be installed to be in fluid communication with an exhaust passage provided in the lower chamber 22.

Although not illustrated in the figures, the substrate stage 100 may further include lift pins for seating the wafer W on the upper surface of the substrate plate 210. Lift pin holes may be formed in the substrate plate 210, and the lift pins may be installed to be movable up and down in the lift pin holes. At least three lift pins may be provided so that the wafer W is seated in a horizontal state.

It will be understood that the arrangement of the substrate plate installed on the base plate has been described as an example, and it may not be limited thereto. For example, the substrate plate may be installed on the base plate by various arrangement manners to be in close contact with a wafer that is deformed and warped at a high temperature.

As mentioned above, the substrate processing apparatus 10 may include the stretchable substrate plate 210 configured to support the substrate such as the wafer W and the heating plate 200 having the liquid metal pattern patterned on the substrate plate 210 as the heating wire for heating the substrate. Since the liquid metal pattern 220 includes liquid metal, the liquid metal may have elasticity and different electromagnetic characteristics (resistivity) for each region of the substrate plate 210.

Since the substrate plate 210 and the liquid metal pattern 220 are stretchable, the heating plate may be easily deformed when the wafer W is vacuum-adsorbed, and thus the heating plate may be more closely adhered to the wafer W warped at high temperature, to thereby increase heat transfer and heat the wafer W at a uniform temperature. Further, it may be possible to reduce or prevent disturbance of air at the wafer edge region by suppressing unnecessary airflow in order to adhere the wafer W to the heating plate 200.

Furthermore, the liquid metal pattern 220 may be easily tuned to have different resistivities for each region of the substrate plate 210, to thereby increase the degree of freedom in heating wire design and the temperature of the heating plate 200 may be controlled with one temperature controller to thereby increase controllability.

Hereinafter, a method of manufacturing the heating plate in FIG. 1 will be described.

Figure 6:
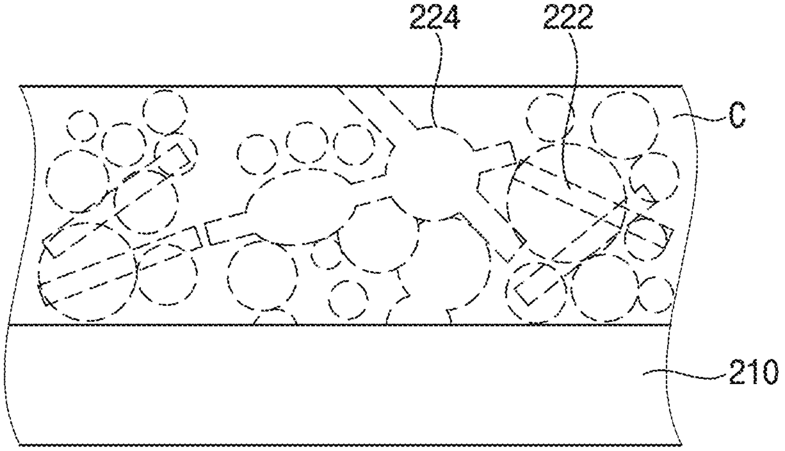
FIGS. 6 to 8 are views illustrating a method of manufacturing a heating plate accordance with example embodiments.
Figure 7:
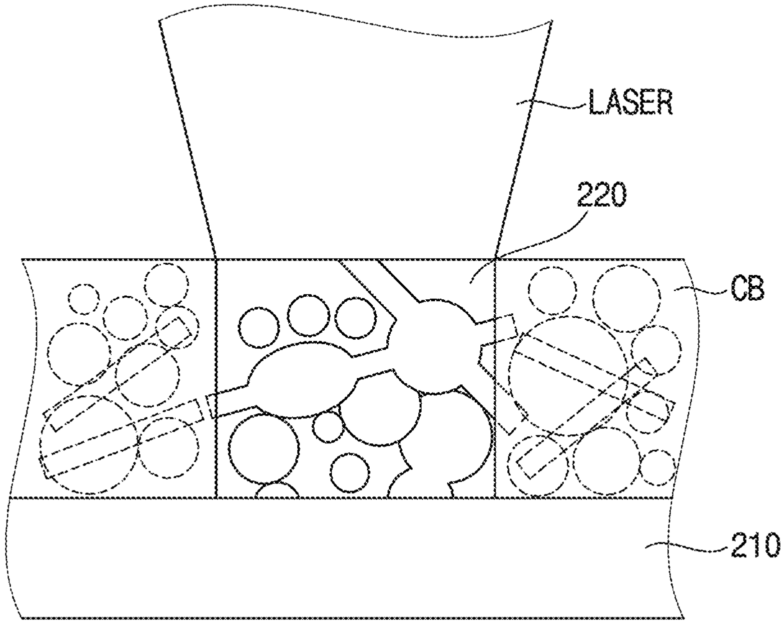
Figure 8:
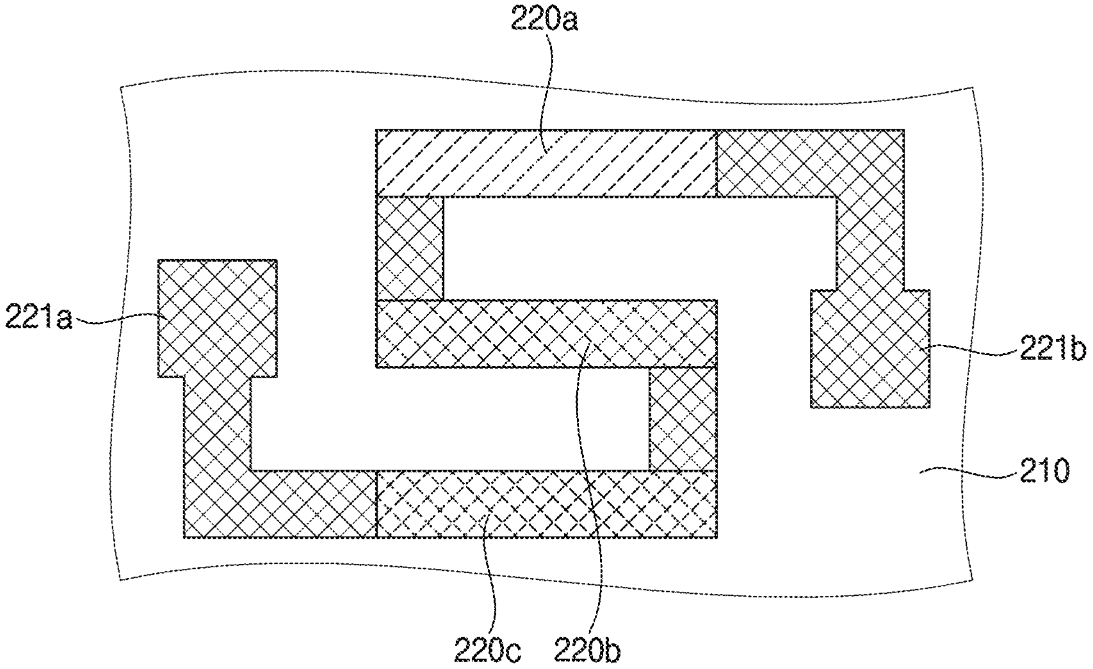

FIGS. 6 to 8 are views illustrating a method of manufacturing a heating plate in accordance with example embodiments.

Referring to FIG. 6, a mixture C of nanowires 222 and a liquid metal 224 may be coated on a stretchable substrate plate 210.

In example embodiments, the substrate plate 210 may be flexible and stretchable. For example, the substrate plate 210 may include a high molecular polymer material. Examples of the polymer material may be PDMS (Polydimethylsiloxane), ECOFLEX, SBS (styrene-butadiene-Styrene), etc.

For example, the nanowires 222 may include silver nanowires (AgNW), copper nanowires (CuNW), gold nanowires (AuNW), etc. The liquid metal 224 may include a gallium-indium alloy (Ga—In) or a gallium-indium-tin alloy (Ga—In—Sn).

Referring to FIGS. 7 and 8, a laser L may be irradiated on the mixture C to form a liquid metal pattern 220, and a portion CB of the mixture C thar is not irradiated by the laser L may be removed.

In example embodiments, the nanowire 222 may serve as a backbone and the liquid metal 224 may serve as a conductor. In a portion of the mixture C that is irradiated by the laser L, entanglement of the two materials may be induced to form a biphasic liquid metal composite. When a weak laser (L) begins to be irradiated, liquid metal (EgaIn) may create a particulate structure and begin to entangle with silver nanowires (AgNW), and when a strong laser (L) is irradiated, liquid metal (EgaIn) may form an anchoring structure that completely surrounds the silver nanowires (AgNW).

Meanwhile, silver nanowires (AgNW) and liquid metals (EgaIn) may not form any interrelationship in the portion CB of the mixture C that is not irradiated by the laser, and the portion CB may be removed from the substrate plate (210) using a cleaning solution such as NaOH or water.

Electromagnetic properties of the biphasic liquid metal composite, such as conductivity and resistivity, may change according to the intensity of laser irradiated onto the mixture. The conductivity of the heating wire may be changed according to the laser intensity. As the laser intensity increases, the resistivity may decrease.

As illustrated in FIG. 8, by adjusting the laser intensity, the conductivity of the heating wire may be tuned such that the first extension line 220*a* has a first resistivity ρ1, the second extension line 220*b* has a second resistivity ρ2 greater than the first resistivity and the third extension line 220*c* has a third resistivity ρ3 greater than the first resistivity and less than the second resistivity. In addition, a first electrode portion 221*a* and a second electrode portion 221*b* may be formed at both ends of the heating wire respectively by maximizing the laser intensity.

The first to fourth extension lines 220*a*, 220*b*, 220*c*, and 220*d* may have the same width D as each other. The width D of the first to fourth extension lines 220*a*, 220*b*, 220*c* and 220*d* may be determined by a line width of the irradiated laser.

Hereinafter, bake processes using a heating plate according to a comparative example and a heating plate according to example embodiments will be described.

Figure 9:
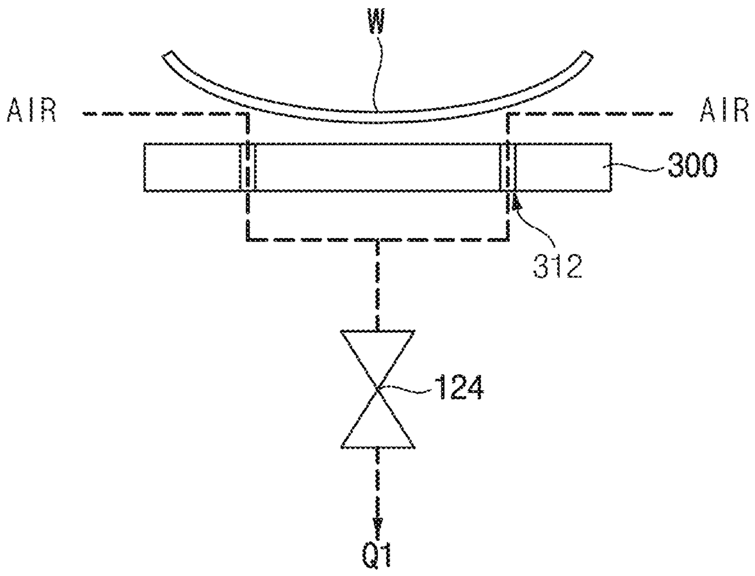
FIG. 9 is a cross-sectional view illustrating a wafer on a heating plate according to a comparative example.
Figure 10:
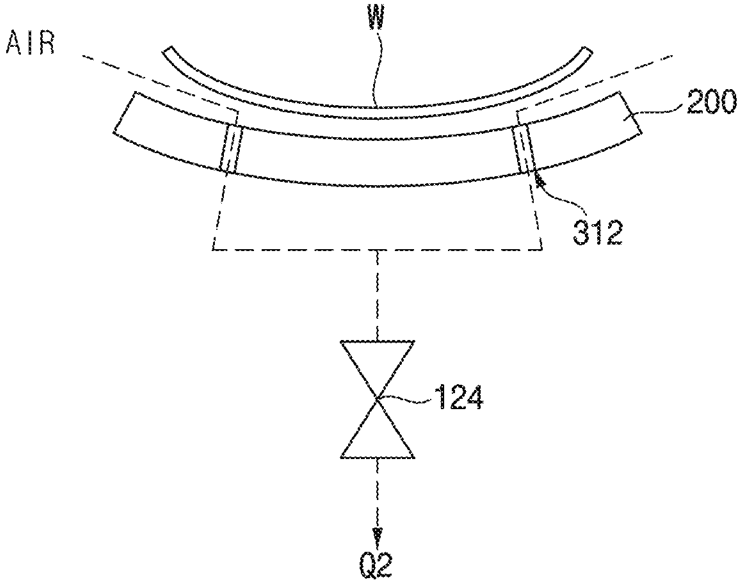
FIG. 10 is a cross-sectional view illustrating a wafer on a heating plate according to example embodiments.

FIG. 9 is a cross-sectional view illustrating a wafer on a heating plate according to a comparative example. FIG. 10 is a cross-sectional view illustrating a wafer on a heating plate according to example embodiments.

Referring to FIGS. 9 and 10, a bake process may be performed on the photoresist layer coated on the wafer W or a bake process may be performed on the coated photoresist layer on which an exposure process has been performed. To perform the bake process, the wafer W may be loaded onto a heating plate 200, 300 of a bake apparatus and the wafer W may be heated to a preset temperature.

As illustrated in FIG. 9, since the heating plate 300 according to the comparative example is a rigid body, a relatively large amount of air Q1 may be suctioned through adsorption holes 312 to adsorb the wafer W warped due to high temperature on the heating plate 300. In this case, the temperature of the wafer W may be irregularly lowered by the air flowing through the adsorption holes 312 and accordingly the wafer W may be non-uniformly heated.

As illustrated in FIG. 10, since the heating plate 200 according to the example embodiments is stretchable, the heating plate may be easily deformed when the wafer W is adsorbed through the adsorption holes 212, and thus may be more closely adhered to the wafer W warped at high temperature. Therefore, even if a relatively small amount of air Q2 is suctioned through the adsorption holes 312, the wafer W may be closely adhered to the heating plate 300 to increase heat transfer to the wafer W and heat the wafer W at a uniform temperature. In addition, in order to adsorb the wafer W to the heating plate 200, unnecessary airflow may be prevented or reduced.

The heating plate and substrate processing apparatus described above may be used to manufacture semiconductor devices. The semiconductor device may be used in various types of systems such as computing systems. The semiconductor device may include fin FET, DRAM, VNAND, etc. The system may be applied to a computer, a portable computer, a laptop computer, a personal portable terminal, a tablet, a mobile phone, a digital music player, etc.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shape.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A substrate processing apparatus, comprising:

a chamber providing a space configured to process a substrate; and a heating plate arranged within the chamber, the heating plate including a substrate plate configured to support the substrate and having a first region, a second region and a third region sequentially arranged in a radial direction from a center of the heating plate, and a liquid metal pattern patterned on the substrate plate and extending on the first region, the second region and the third region, the substrate plate being stretchable.

2. The substrate processing apparatus of claim 1, wherein the liquid metal pattern includes, a plurality of nanowires;
a liquid metal surrounding the plurality of nanowires; and
an oxide layer formed on a surface of the liquid metal.

3. The substrate processing apparatus of claim 2, wherein each of the plurality of nanowires includes at least one selected from silver, copper, and gold, and
the liquid metal includes a gallium-indium alloy or a gallium-indium-tin alloy.

4. The substrate processing apparatus of claim 1, wherein the liquid metal pattern includes,
a first extension line extending within the first region;
a second extension line extending within the second region; and
a third extension line extending within the third region.

5. The substrate processing apparatus of claim 4, wherein the first to third extension lines have a same width.

6. The substrate processing apparatus of claim 4, wherein the first to third extension lines are connected to each other to form one heating wire.

7. The substrate processing apparatus of claim 6, further comprising:
a power supply connected to both ends of the one heating wire.

8. The substrate processing apparatus of claim 4, wherein the first extension line has a first resistivity, the second extension line has a second resistivity different from the first resistivity, and the third extension line has a third resistivity different from the first and second resistivities.

9. The substrate processing apparatus of claim 8, wherein the second resistivity is greater than the first resistivity, and the third resistivity is greater than the first resistivity and less than the second resistivity.

10. The substrate processing apparatus of claim 1, wherein the substrate plate includes adsorption holes configured to vacuum-suction the substrate.

11. A substrate processing apparatus, comprising:
a chamber providing a space configured to process a substrate; and
a substrate stage within the chamber and configured to support the substrate, the substrate stage including
a substrate plate configured to support the substrate and having a first region, a second region and a third region sequentially arranged in a radial direction from a center of the substrate plate, the substrate plate being stretchable; and
a liquid metal pattern patterned on the substrate plate and extending on the first region, the second region and the third region, the liquid metal pattern including
a first extension line extending within the first region;
a second extension line extending within the second region; and
a third extension line extending within the third region.

12. The substrate processing apparatus of claim 11, wherein the liquid metal pattern includes,
a plurality of nanowires;
a liquid metal surrounding the plurality of nanowires; and
an oxide layer formed on a surface of the liquid metal.

13. The substrate processing apparatus of claim 12, wherein
each of the plurality of nanowires includes at least one selected from silver, copper, and gold, and
the liquid metal includes a gallium-indium alloy or a gallium-indium-tin alloy.

14. The substrate processing apparatus of claim 11, wherein the first to third extension lines are connected to each other to form one heating wire.

15. The substrate processing apparatus of claim 14, further comprising:
a power supply connected to both ends of the one heating wire.

16. The substrate processing apparatus of claim 15, wherein the power supply may supply power to the one heating wire to heat the substrate at a range of 120° C. to 150° C.

17. The substrate processing apparatus of claim 11, wherein
the first extension line has a first resistivity, the second extension line has a second resistivity different from the first resistivity, and the third extension line has a third resistivity different from the first and second resistivities, and
the second resistivity is greater than the first resistivity, and the third resistivity is greater than the first resistivity and less than the second resistivity.

18. The substrate processing apparatus of claim 11, wherein the substrate plate includes adsorption holes configured to vacuum-suction the substrate.

19. The substrate processing apparatus of claim 18, wherein the adsorption holes are spaced apart from each other along a circumferential direction in the second region.

20. The substrate processing apparatus of claim 18, wherein
the substrate stage further includes a base plate configured to support the substrate plate, and
the base plate includes a vent line in fluid communication with the adsorption holes.

* * * * *